No. 898,259. PATENTED SEPT. 8, 1908.
A. F. PRESTON.
CUTTING AND EDGE COMPACTING MEMBER FOR CUTTING MACHINES.
APPLICATION FILED JAN. 16, 1908.
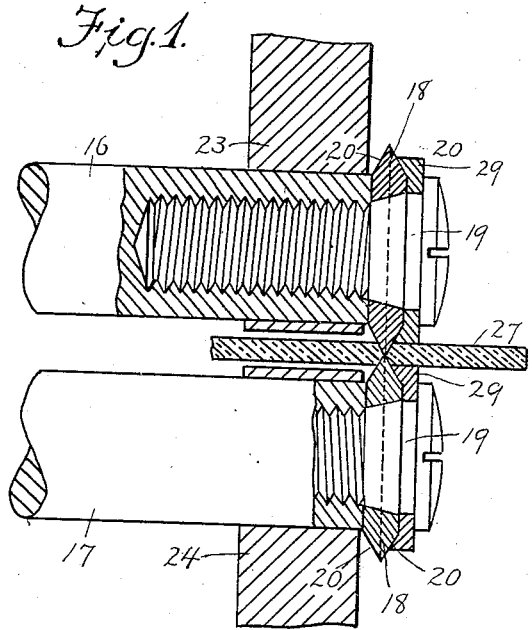
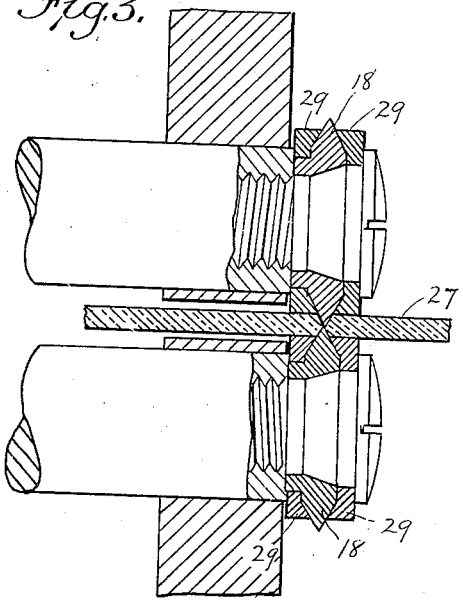
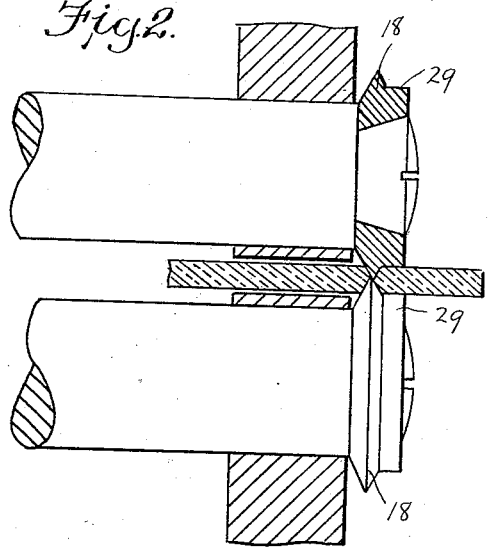
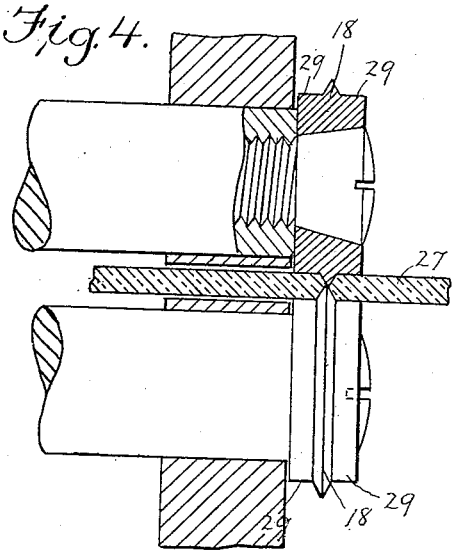
Witnesses:
Inventor:
A. F. Preston

UNITED STATES PATENT OFFICE.

ALBERT F. PRESTON, OF BOSTON, MASSACHUSETTS.

CUTTING AND EDGE-COMPACTING MEMBER FOR CUTTING-MACHINES.

No. 898,259.     Specification of Letters Patent.     Patented Sept. 8, 1908

Application filed January 16, 1908. Serial No. 411,033.

*To all whom it may concern:*

Be it known that I, ALBERT F. PRESTON, of Boston, in the county of Suffolk and State of Massachusetts, have invented certain new and useful Improvements in Cutting and Edge-Compacting Members for Cutting-Machines, of which the following is a specification.

This invention relates to machines for cutting relatively thick sheet material, such as thick heavy paperboard used for making patterns of parts of boot and shoe uppers.

The invention has for its object to provide a machine adapted to form two opposed grooves in opposite sides of a sheet of non-metallic material, said grooves resulting in the severance of the sheet, and to so compact the material displaced in forming the grooves as to prevent the formation of burs or ridges along the edges of the severed parts of the sheet.

The invention is embodied in a pair of cutting and edge-compacting members comprising opposed disk knives adapted to form coinciding grooves in opposite sides of a sheet, and means accompanying the knives for confining and compacting the material displaced by the knives in forming the grooves, no obstacle being presented, however, to the free turning of the work in different directions as it proceeds between the knives and compacting means, the displaced material being prevented from bulging outwardly from the sides of the sheet, so that the edges, formed by conjoint action of the knives, have the same thickness along either straight or curved edges of the pattern as the body of the sheet. The said cutting and edge-compacting members constitute a part of an organized cutting machine which is described and claimed in my application for Letters Patent of the United States, filed December 9, 1907, Serial No. 405,657.

Of the accompanying drawings forming a part of this specification, Figure 1 represents a sectional view of a pair of cutting and edge-compacting members embodying my invention. Figs. 2, 3 and 4, represent similar views showing different embodiments of the invention.

The same letters of reference indicate the same parts in all the figures.

In the drawings, 16 and 17 represent shafts which are located side by side and are journaled in bearings 23 and 24 which are or may be movable on a supporting frame, as shown in my above-mentioned application, so that the disk cutters 18, 18 which are affixed to said shafts by screws 19 may be moved toward and from each other.

Each cutter is provided on its opposite sides with beveled faces 20, these faces meeting to form peripheral cutting edges. Means are provided, as shown in said application, for rotating the shafts simultaneously in opposite directions.

The preferred relative arrangement of the knives is such that the beveled inner face of one knife slightly overlaps the beveled outer face of the other knife, the said beveled faces being in close rubbing contact with each other. The knives are adapted to form coinciding grooves in opposite sides of a sheet 27 to be severed, the formation of said grooves resulting in the severance of the sheet.

I have found that displacement of the material by the beveled sides of the knives is such that burs or raised ridges are formed on the edges of the severed parts, when the knives are used in the manner shown in my former application. In carrying out the present invention, I provide means for confining and compacting the material displaced by the knives in such manner as to prevent the formation of said burs or ridges, and leave the edges of the severed parts of the same thickness as the body of the sheet. The said compacting means are preferably pressure rolls 29 located beside the disk knives, and adapted to bear simultaneously on opposite sides of the sheet 27. The rolls 29 are intimately associated with the disk knives although separate therefrom so that the knives and rolls practically form a single part or structure, the inner ends of the peripheries of the rolls meeting the sides 20 of the disk knives without interruption. The peripheries of the rolls and the beveled sides of the knives therefore form obtuse angles, as shown in the drawings. The peripheries of the rolls are concentric with the cutting edges of the knives and the rolls rotate with the knives. The nip of the rolls is therefore directly beside and in close proximity to the acting portions of the knives which form the coinciding grooves in the sheet 27. The diameter of the rolls is such that the space between them at the nip of the rolls preferably does not exceed the thickness of the sheet 27. It will be seen therefore, that, when the machine is in operation, the disk knives form coinciding V-shaped grooves in the sheet 27, and that the material of the sheet, which is displaced by the formation of said grooves, instead of bulging outwardly, as shown at 28 in Fig. 5, is confined and compacted by the rolls 29, so that the edge formed by the action of the cutters is of practically the same thickness as the body of the sheet.

The rolls may be constructed and connected with the knives in any suitable way, and each knife may have a roll at one or both sides of its cutting edge. In Figs. 1 and 2, I show one pair of rolls, these being located at the outer sides of the cutting edges of the knives. This construction is suitable for use when the knives are used simply for trimming a surplus edge or waste piece from the sheet of material where the part removed from the sheet does not require compression and compacting. In Figs. 3 and 4, I show a pair of rolls accompanying each knife, the rolls being at opposite sides of the cutting edge of the knife, so that the edges of the two pieces severed by the action of the knife are simultaneously compacted and compressed.

The rolls may be in separate pieces from the knives as shown in Figs. 1 and 3, or integral therewith as shown in Figs. 2 and 4.

When the rolls are made as separate parts, they are adapted to rotate loosely so that their rotation may be independent of that of the knives, when the work is being turned to form a curved cut and a correspondingly curved edge on the pattern, or other article formed by the cutters. Under these circumstances, the rolls will rotate more rapidly when they are at the concave side of a curved cut than when they are at the convex side, the speed of the rolls corresponding to the speed of the sheet passing between them. The friction developed between the rolls and the sheet is therefore reduced to the minimum by the loose mounting of the rolls.

As has been stated, the machine is especially designed for cutting material for making patterns which are of course always more or less irregular in outline, having some straight edges and other edges which are curved to different degrees of radii. Owing to the fact that the spaces at opposite sides of the nip of the knives are entirely open and unobstructed, the sheet of material is free to be turned in different directions as it is passed between the knives to follow different curved lines.

I claim:

1. The combination with a pair of rotary shafts, of a beveled-edge disk knife removably attached to the end of each shaft, said knives being adapted to form coinciding grooves in opposite sides of a sheet, and means accompanying the knives for compacting the material displaced thereby, the spaces at opposite sides of the nip of the knives being open and unobstructed to permit the sheet to be turned in different directions as it is operated upon.

2. The combination with a pair of rotary shafts, of a beveled edge disk knife removably attached to the end of each shaft, said knives being adapted to form coinciding grooves in opposite sides of a sheet, the spaces at opposite sides of the nip of the knives being open and unobstructed to permit the sheet to be turned in different directions as it is operated upon, and pressure rolls located beside the knives and adapted to bear simultaneously on the sides of the sheet.

3. The combination with a pair of rotary shafts, of a beveled edge disk knife removably attached to the end of each shaft, said knives being adapted to form coinciding grooves in opposite sides of a sheet, the spaces at opposite sides of the nip of the knives being open and unobstructed to permit the sheet to be turned in different directions as it is operated upon, and rolls accompanying the knives for compacting the material displaced thereby, the inner ends of the peripheries of the rolls meeting the sides of the knives.

4. The combination with a pair of rotary shafts, of a beveled-edge disk knife removably attached to the end of each shaft, said knives being each beveled on both sides to form a cutting edge, and pressure rolls located beside the knives, the peripheries of the rolls forming obtuse angles with the sides of the knives, the spaces at opposite sides of the nip of the knives being open and unobstructed to permit the sheet to be turned in different directions as it is operated upon.

5. A pair of opposed rotary disk knives adapted to form coinciding grooves in opposite sides of a sheet, and loose pressure rolls located beside the knives, and adapted to rotate independently of the knives.

6. A pair of opposed rotary disk knives adapted to form coinciding grooves in opposite sides of a sheet, and two pairs of loose pressure rolls located at opposite sides of the knives, and adapted to rotate independently of the knives.

In testimony whereof I have affixed my signature, in presence of two witnesses.

ALBERT F. PRESTON.

Witnesses:
C. F. BROWN,
P. W. PEZZETTI.